United States Patent [19]
Koeth

[11] 4,041,418
[45] Aug. 9, 1977

[54] EQUALIZER FOR PARTIAL RESPONSE SIGNALS

[75] Inventor: Helmut Koeth, Munich, Germany

[73] Assignee: Siemens Aktiengesellschaft, Munich, Germany

[21] Appl. No.: 589,930

[22] Filed: June 24, 1975

Related U.S. Application Data

[63] Continuation-in-part of Ser. No. 431,433, Jan. 7, 1974, abandoned.

[30] Foreign Application Priority Data

Jan. 5, 1973 Germany .............................. 2300454

[51] Int. Cl.² .............................................. H04B 3/04
[52] U.S. Cl. ....................................... 333/18; 325/323
[58] Field of Search ............... 333/18, 28 R; 328/162, 328/165, 167; 325/321, 323

[56] References Cited

U.S. PATENT DOCUMENTS

| | | |
|---|---|---|
| 3,715,670 | 2/1973 | Hirsch et al. ....................... 333/18 X |
| 3,755,738 | 8/1973 | Gittin et al. ........................ 333/18 X |
| 3,764,914 | 10/1973 | Karnaugh ........................... 333/18 X |
| 3,868,603 | 2/1975 | Guidoux .............................. 333/18 |

Primary Examiner—Paul L. Gensler
Attorney, Agent, or Firm—Gerald L. Lett

[57] ABSTRACT

An equalizer for correcting distorted, received data signals, i.e., partial-response signals, is described. The equalizer is of the type which uses a multi-stage shift register and an analog adder, the latter of which emits the corrected signal. In the transmission path between the output of the analog adder and the first stage of the shift register a second analog adder is interposed. An output of one of the succeeding stages of the shift register is connected directly to a second input of the second analog adder. The output of the second analog adder is coupled either directly or indirectly to the first stage of the shift register.

4 Claims, 3 Drawing Figures

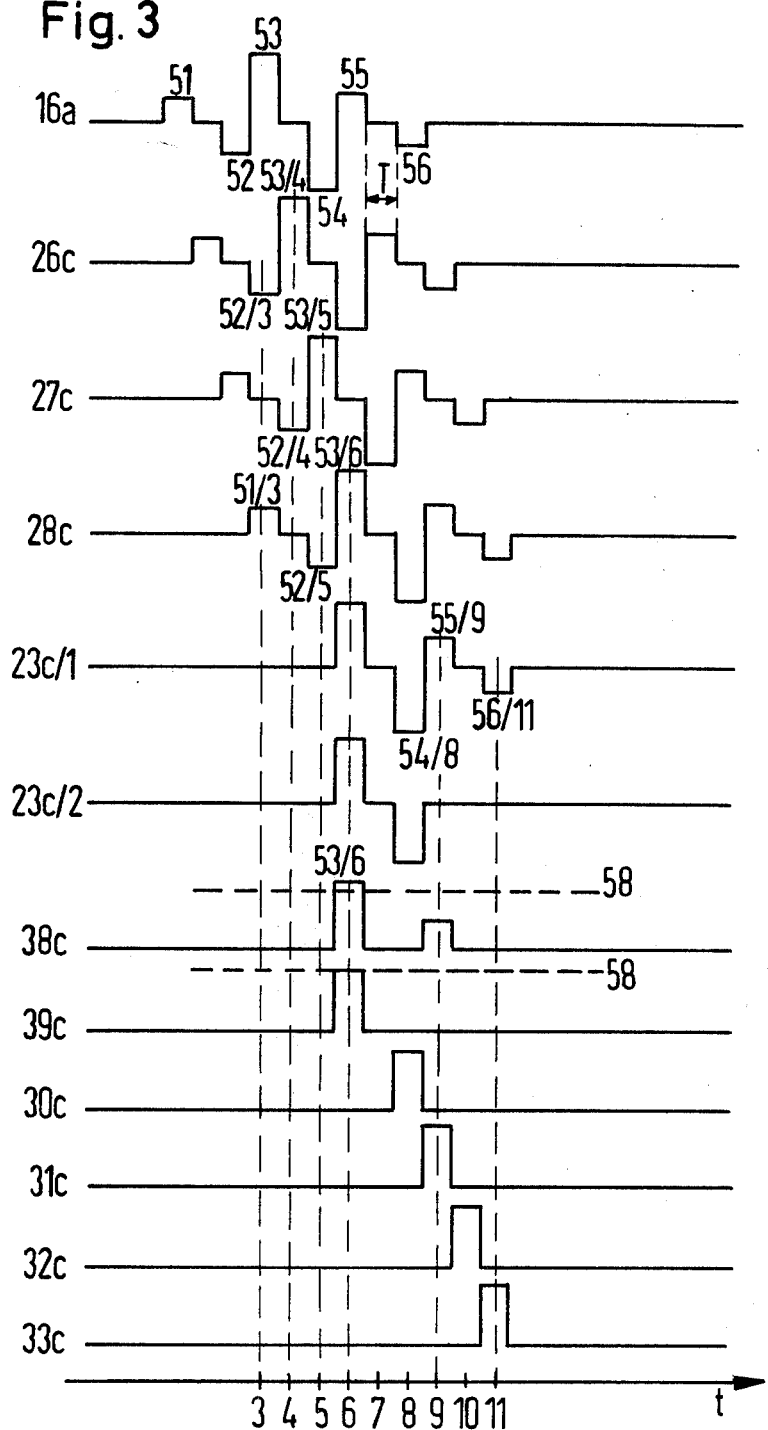

EQUALIZER FOR PARTIAL RESPONSE SIGNALS

This application is a continuation in part of U.S. application Ser. No. 431,433 filed Jan. 7, 1974, was abandoned.

BACKGROUND OF THE INVENTION

The invention relates to an equalizer for partial-response signals of the type comprising a plurality of shift register stages and an analog adder, from the output of which the corrected signal is transmitted, Prior art adaptive equalizers for partial-response signals have the disadvantage that due to the lack of orthogonality of successive partial-response signals, they converge slowly to their setting, or require complicated orthogonalization networks.

An object of the invention is to provide an adaptive equalizer for partial-response signals which adjusts rapidly to its optimum position and can be realized using relatively simple circuitry.

SUMMARY OF THE INVENTION

In accordance with the principles of the invention, the foregoing and other objects are achieved in an equalizer of the type referred to hereinabove. However, a second analog adder is disposed in the transmission path between the output of the aforementioned analog adder and the first stage of the shift register. Furthermore, the output of the analog adder is connected to an input of the second analog adder and the output of one of the stages of the shift register is connected directly to a second input of the second analog adder. The output of the second analog adder is either directly or indirectly connected to the first stage of the shift register.

The adaptive equalizer according to the invention offers the advantages that it requires a small expenditure for circuitry and causes rapid correction of signal overshoot.

If rapid correction of signal preshoots is also desired, it is convenient to provide another shift register having other stages, the outputs of which are each connected to inputs of analog adders over an adjustable amplifier. In so doing, the outputs of two other stages are connected to inputs of another analog adder and the output of said other analog adder is connected to a correlator whose output signal serves to control one of the adjustable amplifiers.

BRIEF DESCRIPTION OF THE DRAWINGS

The principles of the invention will be more readily understood by reference to the description of a preferred embodiment given hereinbelow in conjunction with the three figures of drawings, wherein like reference characters designate like or corresponding parts.

FIG. 3 is a time-waveform diagram illustrating signals appearing in the FIG. 2 equalizer.

DETAILED DESCRIPTION OF THE DRAWINGS

Figure 1:
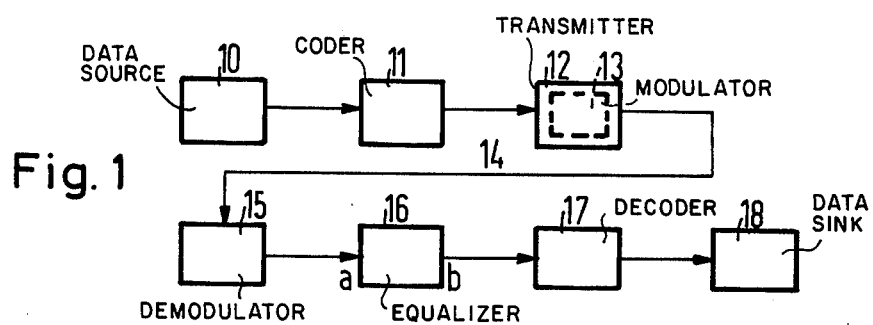
FIG. 1 shows a block diagram of a data transmission system employing partial responses and in which the equalizer of the invention is used.

The data transmission system depicted in FIG. 1 consists of a data source 10, coder 11, transmitter 12 with modulator 13, transmission path 14, demodulator 15, equalizer 16, decoder 17, and data sink 18.

Digital signals, more particularly binary signals, are generated and transmitted by the data source 10 in the usual manner. By way of example, a teleprinter may be provided as a data source 10.

By means of a conventional coder 11, partial-response pulses are assigned to the signals transmitted by the data source 10. More particularly, class IV pulses may be allocated to the signals of the partial responses. A multistage signal is transmitted over the output of the coder 11. For example, by means of the coder 11, the binary signals fed at the beginning can be so processed that a three-stage signal is transmitted over the output of the coder 11.

By means of the transmitter 12 with the modulator 13, both of which are of known construction, a carrier is modulated with the signal fed to the coder 11 so that a frequency conversion takes place, and a modulated signal is transmitted over the output of the transmitter 12. This modulated signal may, for example, occupy a frequency range of approximately 300 to 3400 Hz. The modulated signal is transmitted over the transmission path 14 which, for example, might be a telephone line.

The transmitted signal is demodulated in a conventional demodulator 15 for this type of signal so that from the output thereof a signal is transmitted from the output of demodulator 15 is usually distorted in comparison with the signal routed to the transmitter 12. Such distortions are, as is well known, chiefly caused by the transmission path 14.

The equalizer 16 serves to reduce the distortion of the demodulated signal so that the signal transmitted from the output of the equalizer 16 is substantially more similar to the signal routed to the transmitter 12.

The decoding in decoder 17 cancels the coding effected by coder 11 so that a signal is transmitted over the output of the decoder 17, which is largely similar to the signal of the data source 10. Decoder 17 is of known construction. The decoded signal is routed to the data sink 18. By way of example, a teleprinter may be provided as a data sink.

Figure 2:
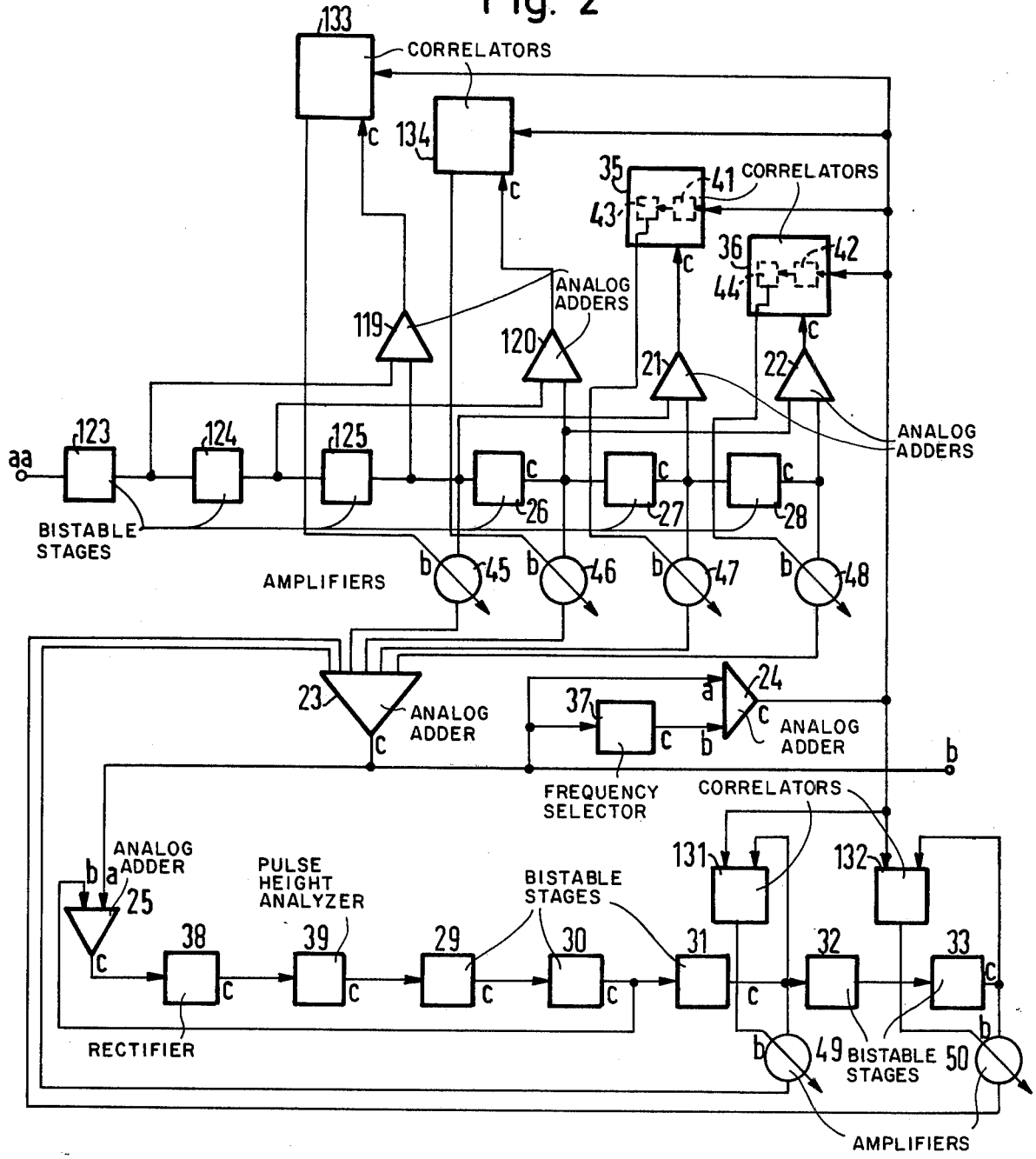
FIG. 2 is a block-schematic diagram illustrating the details of an equalizer constructed according to the invention and shown schematically in FIG. 1.

FIG. 2 illustrates details of the equalizer 16 shown schematically in FIG. 1. The equalizer comprises analog adders 21, 22, 23, 24, 25, 119, 120, bistable switching stages 123, 124, 125, 26, 27, 28, 29, 30, 31, 32, 33, correlators 35, 36 131, 132, 133, 134, nominal-frequency selector 37, rectifier 38, pulse-height analyzer 39 and amplifiers 45, 46, 47, 48, 49 and 50.

The signal being corrected is routed to the stages 123, 124, 125, 26, 27, 28, which form a shift register, over the input aa. This shift register may be constructed in the nature of an analog-quantity shift register or of a digital quantity shift register. It is assumed that an analog or a digital signal is fed over the input aa, depending on the construction of the shift register. The operation of the shift register is assumed to be old in the art, and hence, is not described in detail herein. In the interest of simplicity only six stages are shown, whereas in practice a larger number of stages may be provided.

The outputs of the stages 125, 26, 27, and 28 are connected respectively to the amplifiers 45, 46, 47, and 48. Amplifiers 49 and 50 receive input signals from terminals 31c and 33c. Control signals are fed to amplifiers 47, 48 over the inputs b, and the gains, are so controlled that the signals are amplified or attenuated. The amplifiers 45, 46, 49 and 50 are controlled in like fashion. Thus, correlators 133 and 134, which are constructed like correlators 35 and 36, produce output signals which are coupled to control inputs b of amplifiers 45 and 46, respectively. Correlators 131 and 132, which are constructed like correlators 35 and 36, produce output signals which are coupled to control inputs b of amplifiers 49 and 50, respectively. This form of construction is known as indicated by U.S. Pat. Nos. 3,715,760 and 3,755,738. A negative transmission, i.e., a phase shift of 180°, may also be caused with the amplifiers.

The corrected signal is transmitted over the output 23c of analog adder 23 and over the output b of the equalizer 16. The corrected signal is also routed to the nominal frequency selector 37, which transmits a signal over the output 37c; this signal indicates the nominal value of the currently transmitted amplitude level. The analog adder 24 operates as a differential stage and transmits an analog signal over the output 24c, which indicates the respective difference between the amplitude of the corrected signal and the nominal value of the amplitude level. Thus, a signal is transmitted over the output 24c which identifies the error of the corrected signal.

The correlators 35 and 36 each contain, respectively, a multiplier 41 and 42 and an integrator 43 and 44. The multipliers 41 and 42 generate multiplicative signals corresponding to the product of the signals fed over the outputs 21c and 24c and 22c and 24c. The multiplicative signals are analog signals which assume several amplitude levels. As indicated hereinabove, the correlators 131 ﹍ 134 are constructed in the same manner. The analog signals are smoothed in the integrators 43 and 44 and are routed as control signals to the inputs b of the amplifier 47 and 48. In this way, the mean quadratic distortion is minimized.

By means of the correlators 35, 36, the analog adders 21, 22, 23, 24, the stages 26, 27, 28, and the amplifiers 47, 48, the preshoots of the signal routed over the input aa are corrected.

The analog adder 25, the rectifier 38, the pulse-height analyzer 39, the stages 29, 30, 31, 32, 33, and the amplifiers 49, 50 are used to correct the overshoot. A signal is fed to the pulse-height analyzer which can assume several amplitude levels. The pulse-height analyzer 39 transmits a signal corresponding to and a function of the nominal values of the amplitude levels.

The stages 29, 30, 31, 32, 33 constitute a shift register, the operation of which is likewise presumed to be old. In the interest of simplicity, only five stages are shown, whereas in practice a greater number of such stages may be provided. The amplifiers 49, 50 enable a gain or an attenuation of the signals coupled to them as a function of a control signal routed over the input b.

FIG. 3 shows a few signals, with the aid of which the mode of operation of the FIG. 2 equalizer 16 will be explained. The signals are identified by the same reference numerals as the circuit points over which they are transmitted. For example, the FIG. 3 signal transmitted over the FIG. 2 output 26c is labeled 26c. Units of the time t are measured along the x-axis and the pulse amplitudes are measured along the y-axis.

The signal 16a represents a distorted partial-response signal consisting of the pulses 51, 52, 53, 54, 55, 56. The pulses 51 and 52 produce the preshoots, the pulse 52 produces the positive principal value, the pulse 54 produces the negative principal value, and the pulses 55 and 56 produce the overshoots. The signal 16a is delayed by one clock period T by means of the stage 26, resulting in the signal 26c. The stages 27 and 28 causes one clock period delay each so that the corresponding signals 27c and 28c are obtained. The signals 27c and 28c are fed to the amplifiers 47 and 48, respectively. The gain of the amplifier 48 is determined according to the following equation:

C48($t$) = C48($t-1$)-$d \cdot e$(S28$c$+S26$c$) where: C48($t$) is the gain of the amplifier 48 at the instant $t$, C48($t-1$) is the gain of amplifier 48 at the instant $t-1$; d is a proportionally control factor; e is the amplitude difference between the corrected signal at the output 23c present as true value and the set value thereof. Thus, the reference character e also means the error of the signal transmitted over the output 23c; S28c is the amplitude of the signal at the output 28c at the instant $t$, and S26c is the amplitude of the signal at the output 26c at the instant $t$.

With regard to the mode of operation of the equalizer 16 shown in FIG. 2, it is at first assumed that the gain 47 of the amplifier 47 equals 0 and that no signal is fed to the analog adder 23 over the output of the amplifier 47. It is likewise assumed that no error signal is transmitted over the output 24c and that the gain C48 equals 1. Thus, the amplifier 48 causes neither a gain nor an attenuation of the signal fed over the output 28c. The signal is fed to the analog adder 23, and its output signal is transmitted to the input a of the analog adder 24 and to the nominal-frequency selector 37.

At the instant $t=6$, the error signal is transmitted over the output 24c to the correlators 35 and 36, by means of the nominal-frequency selector 37. The error signal e identifies the excursion of the pulse 53/6 from the set point.

Control signals are derived by means of the correlator 35 or 36 as a function of the error signal and fed to the amplifier 47 or 48 so that their gains are set according to the equation set forth above. Furthermore, signals are transmitted to the analog adder 23 over the outputs of both amplifiers 47 and 48 and added there.

At the instant $t=5$, the preshoot 52/5 is suppressed, because the gain C47 is so set that the pulses 52/5, 53/5 compensate each other.

At the instant $t=4$, the gain C46 of the amplifier 46 is so set that the pulses 52/4 and 53/4 compensate each other.

At the instant $t=3$, the preshoot 51/3 is suppressed, because the gain C45 of the amplifier 45 is so set that the pulses 51/3 and 52/3 compensate each other. If the analog adder 22 had not been provided and the signal were fed directly to the multiplier 42 from the output 28c, then the pulse 52/3 would not be taken into account when determining the control signals. Thus, the pulse 52/3 would cause a preshoot of the signal 28c even if the pulse 51/3 were eliminated in a different manner. Thus, the analog adder 22 causes the simultaneous elimination of the pulses 51/3 and 52/3. After the preshoots have been corrected, the signal 23c/1 is transmitted from the output 23c, which signal does not have preshoots 51 and 52, in contradistinction to the signal 16a applied to the input.

The signal 23c/1 is transmitted to the rectifier 38 over the input of the analog adder 25 for the purpose of correcting the overshoot. The rectifier 38 suppresses the negative pulses 54/8 and 56/11, resulting in the signal 38c.

In the pulse-height analyzer 39 a check is made to determine if the signal 38c contains a pulse, the amplitude of which is approximately the same as the set value 58. In the present example, the amplitude of the pulse 53/6 is about the same as the set value 58 so that the signal 39c is transmitted over the pulse-height analyzer 39.

The stages 29 and 30 delay the signal 39c by two clock periods so that a signal 30c delayed by two clock periods is transmitted to the input b of the analog adder 25 over the output 30c.

Thus, the signals 23c/1 and 30c are applied at the inputs a and b of the analog adder 25. In the course of the addition, the pulse 54/8 is eliminated by means of the analog adder 25 and the signal 30c.

By means of the stage 31, the signal is delayed by one period, resulting in the signal 31c, which is routed to the amplifier 49. The gain of the amplifier 49 is so adjusted that the pulses 55/9 and 31c are eliminated by means of the analog adder 23, thereby eliminating the first overshoot 55/9.

The signal 31c is delayed by means of the stages 32 and 33, resulting in the signals 32c and 33c. The gain of the amplifier 50 is so set that also the second overshoot, viz. the pulse 56/11, is eliminated. Finally, after the elimination of the two overshoots 55/9 and 56/11, the signal 23c/2 is transmitted over the output 23c of the analog adder 23, which signal represents an undistorted partial-response signal. The rectifier 38 eliminates negative pulses, if this result is not brought about by the signal routed over the input 25b.

During the generation of the signal 23c/2 it is essential that between the output 30c and the input b of the analog adder 25 no controlled gain amplifier be interposed. Basically, it is possible to interpose an amplifier with a fixed gain between the output 30c and the input 25b, which, however, only causes the adaptation of the level of the signal transmitted over the output 30c to the level of the signal fed over the input 25b. The level adaptation is thus dependent upon the stage 30 employed in each case and causes no regulation of the signal level as is, for example, caused with the aid of the amplifier 34.

The invention has been described by describing a preferred embodiment constructed according to its principles. It is contemplated that the described embodiment can be modified or changed in a variety of ways, while remaining within the spirit and scope of the invention, as defined by the appended claims.

I claim:

1. An equalizer for partial-response signals having data detection means for receiving input data signals and transforming same into signals of predetermined discrete amplitudes and error means for producing error signals indicative of the differences between said input signal amplitudes and said discrete amplitudes, comprising:
   first shift register means comprising a plurality of bistable stages forming a transversal filter,
   a plurality of adjustable gain amplifier means, each having an input connected to an output of a different one of said bistable stages of said first shift register means, said amplifiers being coupled to said error means so that said error signals control the gains thereof,
   first analog adder means having inputs connected to outputs of said plurality of adjustable gain amplifier means,
   second shift register means having a plurality of bistable stages and
   second analog adder means having an input connected to an output of said first analog adder and another input connected to the output of a predetermined one of the stages of said second shift register means and having an output coupled to an input of the first stage of said second shift register means.

2. The equalizer defined in claim 1 further comprising:
   third analog adder means having inputs coupled to outputs of predetermined ones of the stages of said first shift register means and output means coupled to said error means,
   frequency selection means having an input coupled to the output of said first analog adder and
   fourth analog adder means having inputs coupled, respectively, to an output of said first analog adder means and an output of said frequency selection means and an output coupled to an input of said error means.

3. The equalizer defined in claim 1 further comprising:
   pulse-height analyzer means having an input coupled to an output of said second analog adder means and an output connected to the input of the first stage of said second shift register means.

4. The equalizer defined in claim 2 wherein between the first stage of said second shift register means and the stage of said second shift register means having an output connected to an input of said second analog adder means there as many stages as between those stages of said first shift register means whose outputs are connected to inputs of said third analog adder means.

* * * * *